United States Patent [19]
Wydra et al.

[11] Patent Number: 6,010,657
[45] Date of Patent: *Jan. 4, 2000

[54] METHOD OF MANUFACTURING A BELLOWED SEAL

[75] Inventors: Neal E. Wydra, Glen Ellyn; David W. Geick, Jr., North Aurora, both of Ill.

[73] Assignee: Miner Enterprises, Inc.

[*] Notice: This patent is subject to a terminal disclaimer.

[21] Appl. No.: 09/106,559

[22] Filed: Jun. 29, 1998

Related U.S. Application Data

[63] Continuation of application No. 08/649,152, May 17, 1996, Pat. No. 5,851,476.

[51] Int. Cl.[7] .............................. B29C 49/00; B29C 53/08
[52] U.S. Cl. ......................... 264/507; 264/295; 264/322; 264/339
[58] Field of Search .................... 264/506, 507, 264/DIG. 52, 539, 295, 296, 339, 322; 277/212 FB; 464/175

[56] References Cited

U.S. PATENT DOCUMENTS

| | | | |
|---|---|---|---|
| 3,076,228 | 2/1963 | Johnson | 264/507 |
| 3,371,381 | 3/1968 | Louth | 264/507 |
| 4,079,111 | 3/1978 | Uhlig | 264/507 |
| 4,409,176 | 10/1983 | Jakobsen et al. | 264/507 |
| 5,236,656 | 8/1993 | Nakajima | 264/506 |
| 5,330,342 | 7/1994 | Linss et al. | 264/506 |

FOREIGN PATENT DOCUMENTS

| | | | |
|---|---|---|---|
| 58-134717 | 8/1983 | Japan | 264/506 |
| 652810 | 5/1951 | United Kingdom | 264/507 |

*Primary Examiner*—Catherine Timm
*Attorney, Agent, or Firm*—John W. Harbst

[57] ABSTRACT

An improved seal or boot for inhibiting contaminants from interfering with operation of a mechanism having two flexibly interconnected components which axially extend from opposite ends of the seal. The seal is formed as a one-piece hollow and elongated body defining an enclosed cavity wherein the pivotal connection of the mechanism is arranged and having first and second annular mounting ends. The first and second annular mounting ends are configured to allow the components of the mechanism protected by the seal to axially extend therefrom. To permit flexural movement of the seal and the interconnected components of the mechanism protected by the seal, a plurality of bellow-like configurations are disposed along a major length of the seal between the first and second mounting ends. Each bellow-like configuration on the seal has predetermined root and crest diameters with wall sections of a predetermined material thickness extending therebetween. To facilitate economic manufacture of the seal, the elongated body is formed from a cost efficient non-blow mold grade thermoplastic polyester elastomer. Forming the seal from a non-blow mold graded thermoplastic polyester elastomer furthermore enhances the durability and life of the seal.

6 Claims, 7 Drawing Sheets

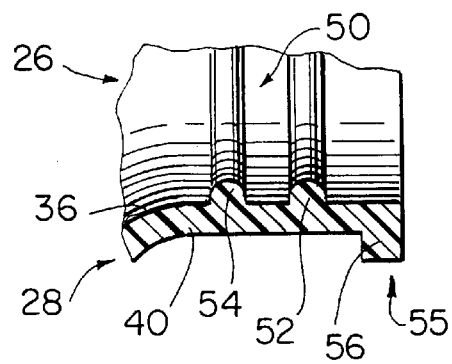
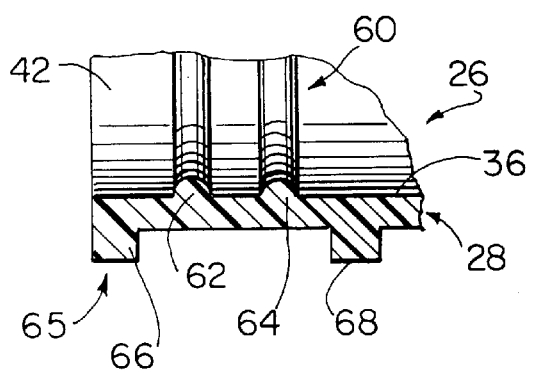
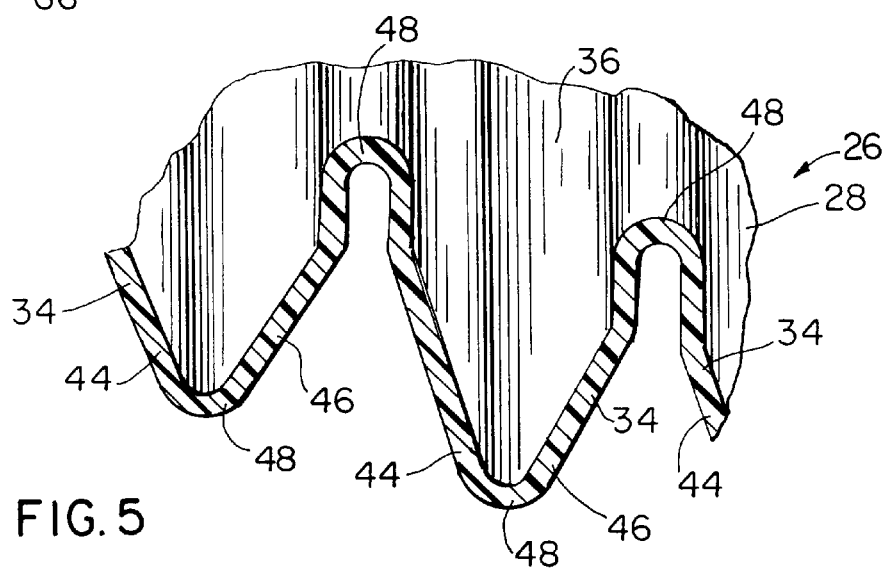
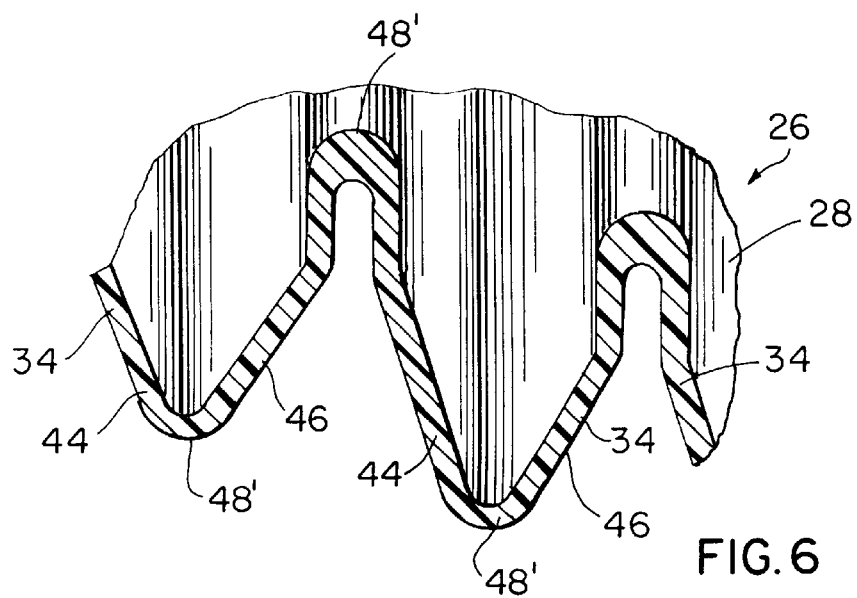

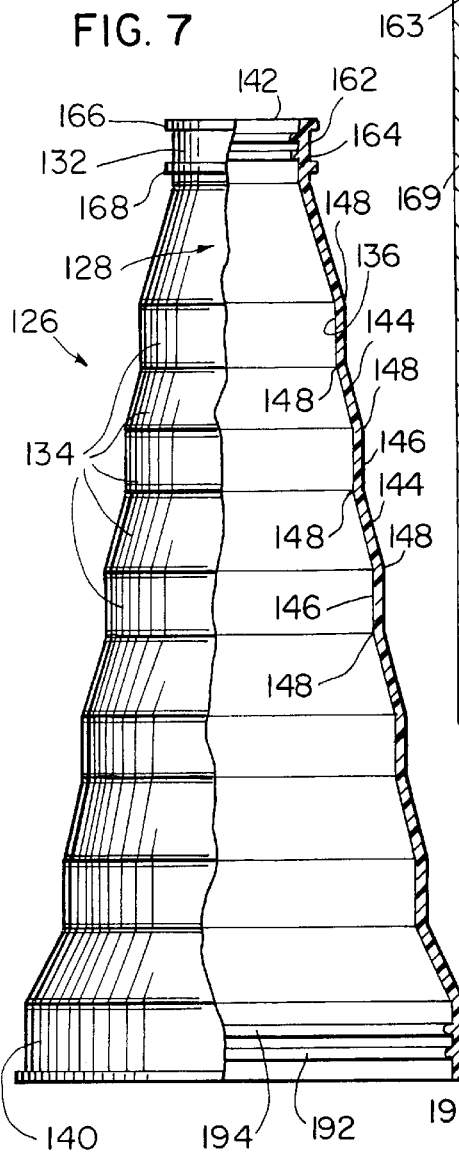
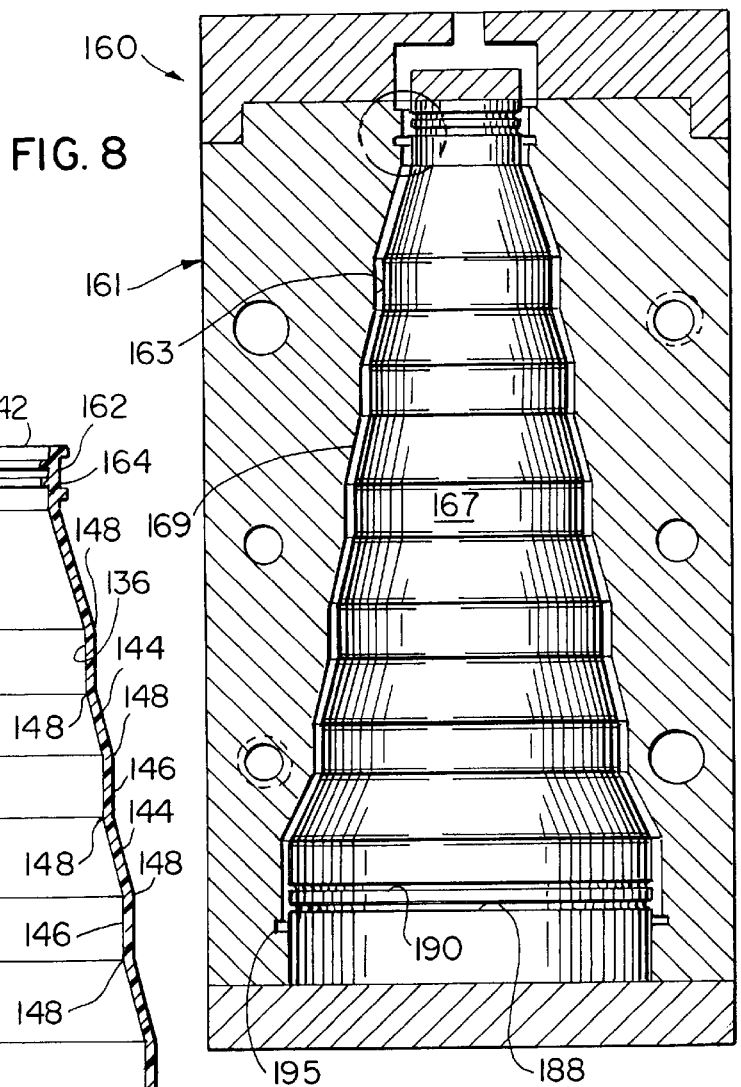
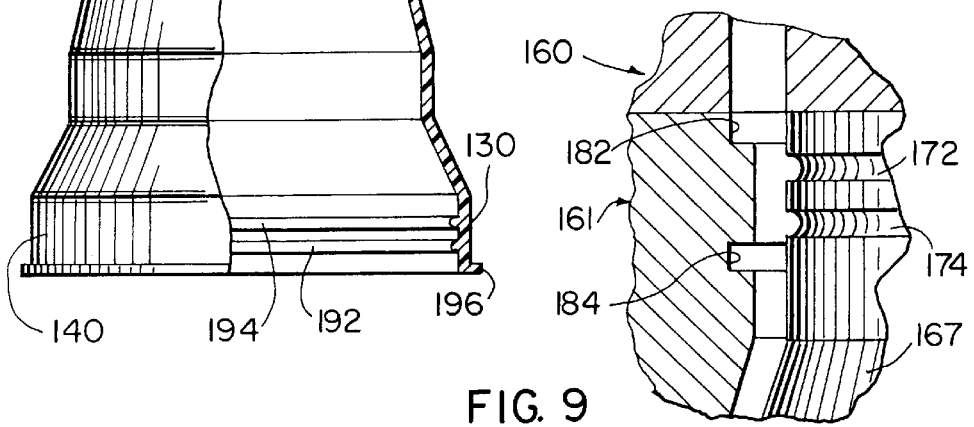
FIG. 7
FIG. 8
FIG. 9

METHOD OF MANUFACTURING A BELLOWED SEAL

This application is continuation of 08/649,152, filed May. 17, 1996, now U.S. Pat. No. 5,851,476.

FIELD OF THE INVENTION

The present invention generally relates to seals and, more specifically, to a bellowed se for preventing contaminants from interfering with an articulated mechanism housed within and axially extending beyond opposite ends of the bellowed seal. The present invention also discloses a method of economically manufacturing bellowed seals.

BACKGROUND OF THE INVENTION

Mechanisms having two articulately interconnected rotatable components are well known in the art. The articulated or pivotal connection between the rotatable components allows for flexural movement of the components relative to each other while maintaining a rotatable drive connection therebetween. For example, a constant velocity joint on a vehicle is comprised of two pivotally interconnected and elongated members which operate to transfer rotary motion and torque. The pivotal joint allows the members to flexibly and angularly move out of axially aligned relation relative to each other while maintaining the capability of transferring rotary motion therebetween with little or no loss of power.

As will be appreciated by those skilled in the art, and during operation of the joint, the relative movement between the components comprising the pivot or articulate connection between the members can give rise to significant friction forces especially when the elongated members are flexibly or angularly disposed relative to each other. Accordingly, it is c ,mm₁n to lubricate the component parts of the constant velocity joint in an effort to reduce the fiction forces. Different forms of grease or other suitable lubricants have been used to effect ends.

Depending upon the environment in which tile constant velocity joint is disposed, the components of the joint are commonly subjected to dust, dirt and other contaminants Unfortunately, the grease or lubricant used to reduce the frictional forces between the components of the mechanism tends to attract and intermix with the contaminants, thus, adversely affecting the interrelationship between the component parts of the constant velocity joint. This problem is exacerbated when the constant velocity joint is arranged on a vehicle. As the vehicle is driven across a field or road, the wheels or tires tend to pick up dirt, stones, moisture, and etc. As is well known, a constant velocity joint of a vehicle is typically arranged in an area disposed proximate to the wheel of the vehicle and, thus, is subject to the dust; dirts moisture, stones and other contaminants directed there toward with forceful movement by the wheels or tires of the vehicle. As mentioned, the lubricant conventionally used in combination with the constant velocity joint of the vehicle typically mixes with the contaminants, thus, adding the problem of wear between the components of the constant velocity joint.

To inhibit contaminants from interfering with the constant velocity joint, seals or boots for protectively covering the joint have been proposed. One of the more common seals or boots that have been designed to protect constant velocity joints has a bellowed configuration between opposite ends thereof. That is, series of joined and adjacent bellow-like configurations art disposed between opposite ends of the seal. Each bellow-like configuration of the seal includes crest and root diameters with annularly and angularly diverging wall sections extending therebetween.

Such seals or boots envelope the constant velocity joint and allow the pivotally interconnecting drive components to axially extend outwardly from opposite ends thereof while the bellow-like configurations provide the flexibility required to allow the interconnected drive components to angularly and linearly move relative to each other. As will be appreciated, during operation of the constant velocity joint, the bellows portion of the seal is subject to substantial flexural forces as the seal is required to continually expand, retract, turn and angulate. Because of the severe flexural forces imparted to the bellow seal or boot during operation of the constant velocity joint, such seals tend to fail quickly.

Manufacturing costs associated with a vehicle are an important concern. Each vehicle typically includes at least two bellow seals or boots for protecting an equal number of constant velocity joints. Some vehicles require four or more bellow seals for protecting the constant velocity joints thereon. Accordingly, it is imperative that the cost of the seals or boots be minimized.

Constant velocity joint seals made of silicon advantageously retain their flexibility but are generally relatively expensive. Constant velocity joint seals or boots manufactured from natural rubber products have poor durability during operation and tend to quickly fail thus exposing the constant velocity joint protected thereby to contaminants. In the vast majority of applications, a bellowed seal is manufactured using blow molding techniques. Often steel reinforcing rings are placed around the bellow seal to give it radial strength.

While bellowed seals or boots manufactured using blow molding techniques offer certain advantages over silicon or rubber bellowed seals, they have certain limitations of their own which often prove to be a significant disadvantage when used in combination with twisting and turning constant velocity joints. For one thing, the material thicknesses of injection blow molded seals is difficult to control with regularity du ring their manufacturing process. Accordingly, the annular and angularly diverging walled sections of each bellow-like configuration typically varies in material thickness about their circumference and the material thicknesses of the wall sections of the bellow-like configurations often noncontrollably vary even between adjacent bellow-like configurations. Moreover, it is difficult to control the material thicknesses of the root and crest diameter sections of each bellow-like configuration when the seal is formed using blow-molding grade materials and blow molding techniques.

During an injection blow molding manufacturing process for bellowed seals, an elongated, molten, cylindrical-like parison of blow-nmolded thermoplastic material having about a 1.8 to 2 melt-flow rate value at the 230° C. and under 2160 g. load is introduced into a die assembly. After introducing the parison into the mold, the elongated and molten parison is blown outwardly under pressure to foni the relatively deep bellows typically inherent with constant velocity joint seal or boot designs. As mentioned, however, blow molding techniques used to form bellowed seals from molten parisons typically result in considerable variances in the material thicknesses in different areas along the length and about the bellowed seal. These variations in material thicknesses about the annular wall sections, as well material thicknesses at the root and crest diameters of the bellows, along the length of and about the circumference of the seal, resulting from known manufacturing processes cause difficulty in controlling material thicknesses, tend to result in different load stresses being imparted toward to the seal or boot as it expands, retracts, flexes, turns and angulates during its flexural operation.

Constant velocity joints protected by the bellowed seals are not visually apparent on most vehicles. To the contrary, the bellowed seals are usually disposed in areas usually visible only if and when the vehicle is elevated. Since the purpose of the seal is to prevent contaminants from interfering with proper operation of the constant velocity joint, failure of seal is likewise substantially undetectable. Accordingly, a substantial time period can elapse between the time when the bellowed seal initially fails to completely protect the constant velocity joint and the time such failure is detected. In the interim, substantial irreparable damage can occur to the constant velocity joint.

Thus, there continues to be a need and a desire for a constant velocity joint seal that is economical to manufacture, that offers increased durability from heretofore known injection blow-molded seals, and which can be manufactured using simplified processes.

SUMMARY OF THE INVENTION

In view of the above, and in accordance with the present invention, there is provided an improved seal or boot for inhibiting contaminants from interfering with operation of a mechanism having two flexibly interconnected rotatable components which axially extend from opposite ends of the seal. The seal is formed as a one-piece hollow and elongated body define an enclosed cavity wherein the pivotal connection of the mechanism is arranged and having first and second annular mounting ends are configured to allow the components of the mechanism protected by the seal to axially extend therefrom. To permit flexural movement of the seal and the interconnected components of the mechanism protected by the seal, a plurality of below-lie configurations are disposed along a major length of the seal between the first and second mounting ends. Each bellow-like configuration between opposed ends of the seal is comprised of annularly shaped and angularly diverging wall sections flexibly joined to each other by connecting sections at the root and crest diameters of the seal. A salient feature of the present invention relates to a seal having a bellow-like configurations but wherein the material thicknesses of the wall sections and the connecting sections are proportionately maintained relative to each other along the entire length of and about entirety of the seal. Furthermore, and to facilitate economic manufacture of the seal, the elongated body is formed from a cost efficient non-blow molding grade thermoplastic elastomer. Forming the seal from a non-blow molding grade thermoplastic elastomer furthermore enhances the durability and life of the seal.

Preferably, the non-blow molding grade material used to form the body of the seal is that manufactured and sold by E.I. du Pont de Nemoirs under the trademark Hytrel®. That is, the elongated hollow body forming the seal is formed of an elastomer whose ratio of plastic deformation to its elastic deformation is greater than 1.5 to 1. Unlike blow molding grade materials heretofore used in forming bellowed seals, the thermoplastic ether-ester elastomer material used in the body of the seal of the present invention has about a 7 melt-flow rate value at about 220° C. and under a 2160 g. load. The non-blow molding grade material used to form the seal of the present invention has high durability in that it has about a 500% elongation at break. Accordingly, the material used in the elastomer body of the seal of the present invention is normally capable of withstanding intense and repeated flexural forces imparted thereto.

In contrast to heretofore known molding processes, and as will be discussed hereinbelow, the elastomer body of the seal of the present invention is formed from a rigid and solid perform having a series of convolutions that are transmuted into a series of flexible bellow-like configurations on the seal. Notably, however, the preform has a pre-engineered or predesigned configuration to control material thicknesses of tile seal along and about the entirety of the seal including both annularly and angularly diverging wall sections of each bellow-like configuration. That is, and while any particular bellow-like configuration may have a constant material thickness extending thereabout, another bellow-like configuration axially disposed along the length of the seal may have a constant but different material thickness extending thereabout, Similarly, the material thicknesses of the connecting sections at the root and crest diameters of each bellow-like configuration can be generally equal relative to each other along the entire length of the seal to reduce stress points on the seal which are subject to wear, fatigue and, thus, failure. Alternatively, a connecting- section defining a particular root or crest diameter, while having an equal material thickness extending circumferentially thereabout, may have a different material thickness than a connecting section extending about the entirety of a root or crest diameter disposed axially along tile length of the seal.

Thus, according to one aspect of the present invention, the diverging wall sections of each bellow-like configuration can have generally equal material thicknesses around their entirety thereby reducing stress points on the seal that are subject to fatigue and, thus, failure. Alternatively, the seal can be predesigned such that the material thicknesses of the wall sections and the connecting sections of each bellow-like configuration are controllably varied relative to each such that the seal can be customized to establish a predetermined spring rate capable of withstanding stresses imparted thereto for any particular constant velocity joint configuration.

To promote the ability of the seal to prevent contaminants from interfering with the articulated mechanism housed within the seal, either and/or both of the annular mountings opposite ends of the seal are provided with at least one inner annularly shaped ring formed as an integral part of the body. This annularly shaped ring is adapted to act in combination with the component of the mechanism axially passing through the respective annular mounting to inhibit contaminants from passing inwardly into the hollow cavity defined by the seal thereby preventing contaminants from reaching the mechanism. In a most preferred form of the invention, one or more axially spaced annular rings project radially outward from each annular mounting of the seal body to promote securement of the seal to those components of the mechanism passing axially outwardly from the monitoring ends of the seal.

Unlike heretofore known processes that require a molten parison to be introduced for forced expansion in a die assembly, the present invention further discloses a method for economically producing a bellowed seal comprising the steps of forming the bellowed seal from a rigid preform formed from a non-blow molding grade material that is heated and configured within a collapsible die assembly. Unlike heretofore known methods, the rigid preform used, with the process of the present invention is injection molded and has pre-engineered cross-sectional material thicknesses con figured to achieve desired final characteristics of the bellowed seal. The preform from which the seal of the present invention is provided with a series of axially spaced convolutions between first and second ends of the rigid preform. Each convolution has root and crest diameters.

The non-blow molding grade material comprising the rigid preform is selected from the class comprised of a thermoplastic elastomer having a ratio of plastic strain to elastic strain that is greater than 1.5 to 1. Tile flexibility of the material used is intermediate between that of rubber and engineering plastics. The non-blow molding grade material used has about 7 melt flow rate at 230° C. and under a 2160 g. load thus providing good flexibility, strength, impact resistance and creep resistance at high and low temperatures and good flex crack and abrasion resistance. Furthermore, the material chosen has a broad surface temperature range. Furthermore, and as is advantageously suited to constant velocity joint seals or boots, the material used to form the elongated body of the seal is resistant to tear, abrasion and impact.

The die assembly into which the molded preform is placed for forming the bellowed seal is likewise unique. The die assembly includes a plurality of axially spaced plates which are arranged in collapsible relation relative to each other and which combine with each other to define an elongated cavity into which the rigid preform is placed and subsequently formed. Preferably, each plate is positioned to contact the rigid preform at a root diameter of each convolution on the preform.

The methodology of the present invention is further enhanced by including the step of heating the die assembly to a temperature ranging between about 110° C. and about 190° C. In a preferred from of the invention, each plate of the die assembly is individually heated. In a most preferred form of the invention, the bellowed seal forming process is further enhanced by including the step of controlling the temperatures of the plates individually to achieve the desired transmutation of the preform into the bellowed seal.

After the preform is placed into the die assembly, opposite ends of the preform are sealed to the die assembly. As mentioned, formation of the bellowed seal is then enhanced by warming the die assembly. The seal forming process of the present invention is still further enhanced through the step of injecting pressu!rized fluid into the hollow of the rigid heated preform to cause the preform to transmute to the shape of the die assembly. In conjunction therewith, the heated preform is axially compressed to cause the wall sections of the preform convolutions to deform or transmute into the cavity configuration defined by the die assembly. In a most preferred form of the invention, after the die assembly is collapsed, the die assembly and the preform carried therewithin are both elongated to a height less than that of the final desired shape of the bellowed seal to account for the residual stresses. The formed seal is then removed from the die assembly.

In the preferred form of the invention, the cavity defined within the die assembly has been designed with convolutions which are deeper and more aggressive than those of the desired finished bellowed seal. This is to allow for any elastic stresses remaining in the part which would affect the final shape of the bellowed seal.

A primary object of this invention is to provide a bellowed seal or boot that fits around a mechanism having pivotally interconnected rotatable components extending axially beyond opposite ends of the seal and wherein the seal is cheaply and economically produced while providing advantageous features from that known in the art. Because the constant velocity joint bellowed seal or boot of the present invention is formed from non-blow molding grade material, it costs less to manufacture, therefore, reducing the cost to the ultimate user. As will be appreciated, the cost savings realized in manufacture of the present invention is multiplied by the number of seals used on any particular vehicle. Moreover, forming the bellowed seal from a non-blow molding grade material increases the flexibility, strength, impact resistance and creep resistance of the seal while offering good flex crack and abrasion resistance. As will be readily appreciated, these are all features which are of significant importance when considering application in conjunction with a constant velocity joint. Furthermore, the material thicknesses of the bellowed seal can be readily controlled and predesigned to effect the most advantageous characteristics. That is, since the bellowed seal or boot of the present invention is formed from a pre-engineered and predesigned preform, it is possible to customize the material thicknesses throughout and along the length of the seal to that desired to achieve improved performance characteristics for the seal.

Another object of the present invention is to provide a unique method of making a bellowed seal. With the present invention, the bellowed seal is formed from a rigid preform formed from a non-blow molding grade material that is heated and configured within a collapsible die assembly. Accordingly, the preform can be predesigned as mentioned above to achieve desired final characteristics of the bellowed seal. Rather than using a molten parison, the present invention contemplates a method wherein the seal is formed from a rigid preform. Accordingly, the rigid preform may be formed during one operation and the seal which results from the preform ultimately formed during a second operation. Accordingly, the preforms can be inventoried until required for use. Thus, the concerns over temperature control of the parison during forming are substantially eliminated with the present invention. Since each plate in the die assembly of the present invention has a controlled temperature, the process of the present invention is further enhanced by conforming the temperature ranges along the length of the preform as required during operation. Further preferred steps in the methodology of the present invention reduce residual stresses in the seal and allow for any elastic stresses remaining in the part which would affect the final configuration of the seal.

These and other objects, aims and advantages of the present invention will become readily apparent from the following detailed description when considered with the accompanying drawings and the appended claim.

BRIEF DESCRIPTION OF THE DRAWINGS

FIG. 3 is an enlarged sectional view of that area encircled at the left end in FIG. 2;

FIG. 4 is another enlarged sectional view of the area encircled at the right end in FIG. 2;

FIG. 5 is an enlarged fragmentary sectional view of a bellowed portion of one embodiment of the present invention;

FIG. 6 is an enlarged fragmentary view similar to FIG. 5 but showing a second form of the present invention;

FIG. 7 is an elevational view of a preform used during the forming process of forming the present invention;

FIG. 8 is a longitudinal sectional view of a portion of a mold assembly used to form the preform shown in FIG. 7;

FIG. 9 is an enlarged fragmentary view of that portion shown encircled in FIG. 8;

DETAILED DESCRIPTION OF THE PRESENT INVENTION

Figure 1:
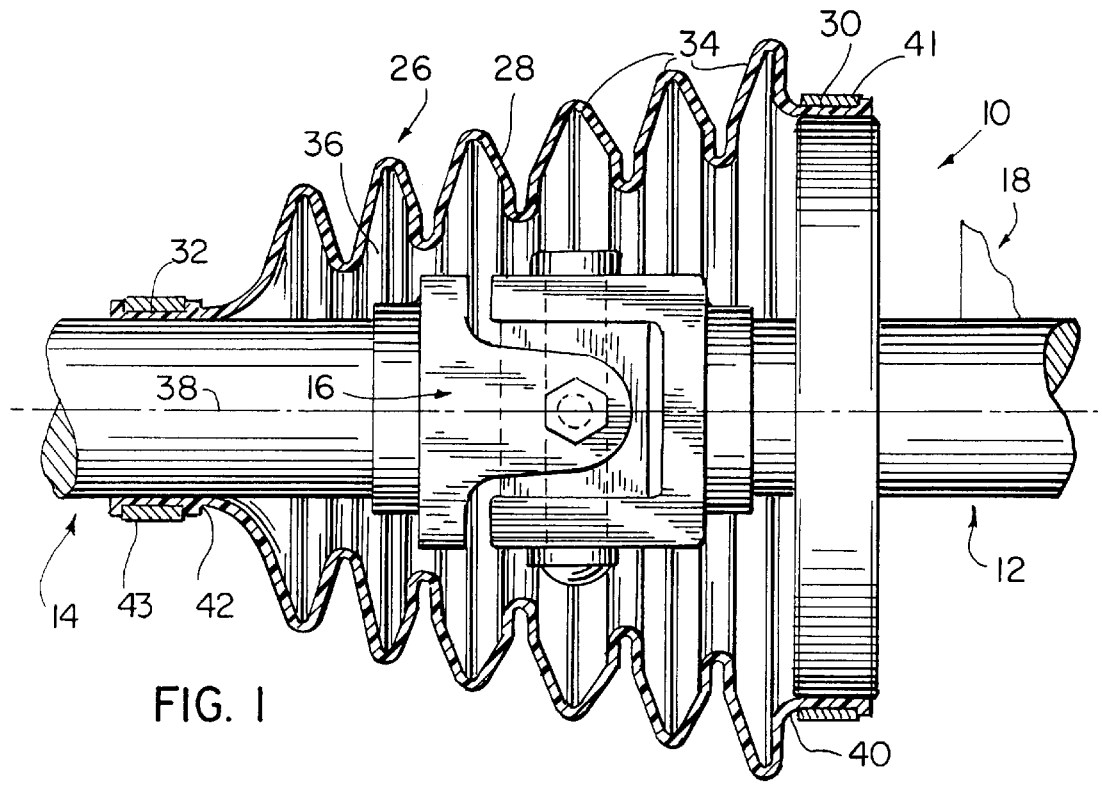
FIG. 1 is a longitudinal sectional view of a seal according to the present invention schematically illustrated as arranged about a constant velocity joint.

While the present invention is suspectable of embodiment in different forms, there is shown in the drawings, and will hereinafter be described, a preferred embodiment of the invention with the understanding that the present disclosure is to be considered as setting forth an exemplification of the present invention which is not intended to limit the invention to the specific embodiment illustrated.

Turning now to the drawings, wherein like reference numerals indicate like parts throughout the several views, FIG. 1 illustrates a mechanism 10 comprised of a pair of axially extending rotatable members 12 and 14 that are articulately or pivotally interconnected to each other by a joint or flexible coupling 16. In the illustrated embodiment, the joint 16 is shown as a constant velocity joint that forms part of a power transfer mechanism on a vehicle 18. Typically, the joint 16 is disposed proximate a wheel or tire (not shown) on the vehicle 18.

As will be appreciated, the constant velocity joint or flexible coupling 16 allows flexural or angular movement of the shafts or members 12, 14 relative to each other from the axially aligned position shown on FIG. 1 with only minimum or no loss of rotary power or torque therebetween. As is conventional, the components of the constant velocity joint 16 are typically coated with a suitable lubricant, such as grease, to minimize the frictional forces and, thus, heat generated during operation of the constant velocity joint 16.

Figure 2:
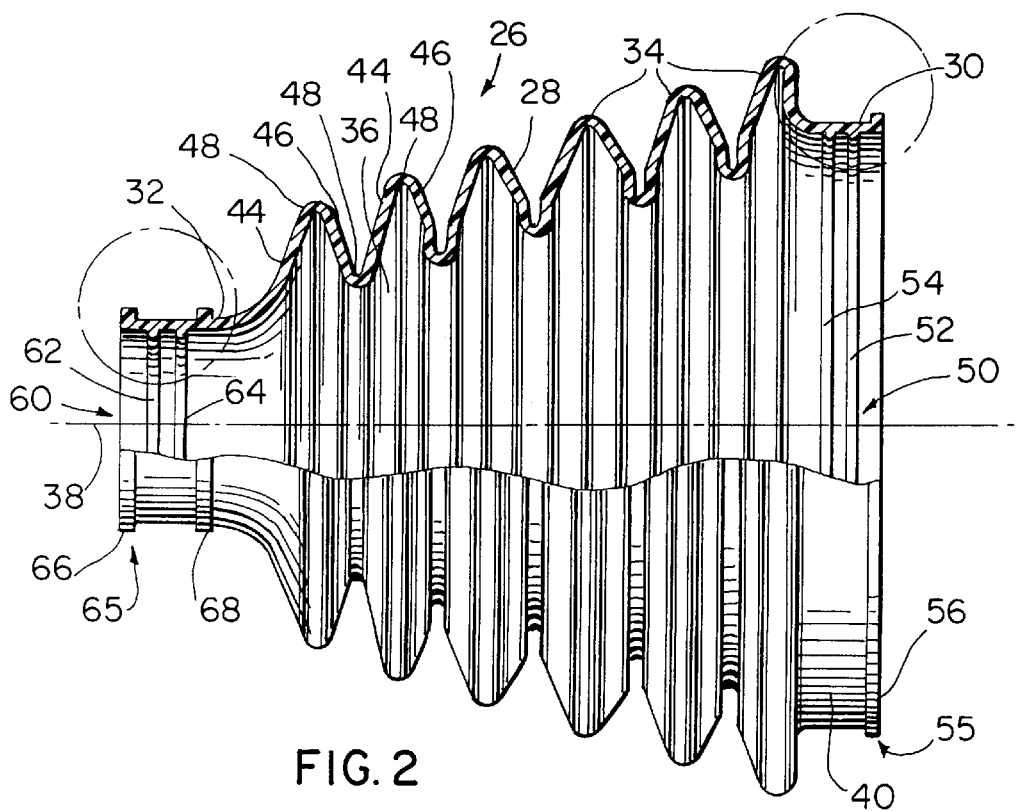
FIG. 2 is an elevational view of the seal of the present invention shown partly in section.

To prevent containments such as dirt, dust, moisture, stones, rocks, and etc. from interfering with the operation of the constant velocity joint or coupling 16, a bellowed seal or boot 26 is arranged in surrounding relation to the joint 16 while allowing members 12, 14 to extend axially from opposite ends thereof. As illustrated in FIGS. 1 and 2, the bellowed seal or boot 26 comprises a one-piece elongated hollow body 28 having first and second open ends 30 and 32, respectively, with a plurality or series of bellow-like configurations 34 extending axially between the open ends 30 and 32 to allow for angular and linear movements of the shaft members 12 and 14 relative to each other.

The seal 26 defines an open and hollow cavity 36 between the ends .30 and 32 wherein the pivotal connection of joint 16 is protectively housed. The open ends 30, 32 of body 28 define an elongated axis 38 for the seal 26. In the illustrated form of the invention, end 30 of the bellowed seal or boot 26 preferably includes an enlarged annular mounting 40 having a generally cylindrical-like configuration axially extending outwardly from the bellow-like configurations 34. In the illustrated form of the invention, end 32 of the seal or boot 26 has a reduced annular mounting 42 having a generally cylindrical-like configuration axially extending outwardly from the bellow-like configurations 34. It should be appreciated, however, that the annular mountings 40 and 42 could be of equal diameter or the annular mounting 42 could have a larger diameter than mounting 40 without detracting or departing from the spirit and scope of the present invention.

A conventional retainer apparatus or ring 41 fits about and releasably secures the annular mounting 40 to member 12 of mechanism 10 (FIG. 1) and thereby prevents inadvertent axial displacement of the seal or boot 26 relative to member 12. Similarly, a conventional retainer apparatus or ring 43 fits about and releasably secures the annular mounting 42 to member 14 of mechanism 10 (FIG. 1) and thereby prevents inadvertent axial displacement of the seal or boot 26 relative to member 14.

In the illustrated form of the invention, and as shown in FIGS. 1 and 2, the bellow-like configurations 34 are integrally formed with and between the annular mounting 40 and 42.

In a preferred form of the invention, the bellow-like configurations 34 are disposed concentrically about the elongated axis 38. The bellow-like configurations 34 illustrated in FIGS. 1 and 2 are necessarily required to have progressively increasing diameters between opposed ends 30 and 32 of the seal, however, it will be appreciated that the present invention is equally applicable to seals having bellow-like configurations that are of substantially equivalent diameter between opposed ends 30 and 32 of the seal 26.

Each bellow-like configuration 34 defines a root diameter and a crest diameter with substantially equal axial pitch between adjacent bellow-like configurations 34. As shown in FIG. 2, each bellow-like configuration 34 includes angularly diverging wall sections 44 and 46 that are joined to each other at the crest and root diameters by connecting sections 48.

According to the present invention, the elongated body 28 of seal 26 is formed of a nonblow molding grade thermoplastic ether-ester elastomer material having tensile characteristics such that the ratio of plastic straight to elastic strain is greater than 1.5 to 1. In contrast to other bellow seals, the non-blow molding grade thermoplastic elastomer material forming the elongated body 28 of seal 26 has about a 7 melt-flow rate value at 220° C. and under a 2160 g load and has about a 500% elongation rate at a specified speed before it breaks. One such elastomer is manufactured and sold by E.I. du Pont de Numoirs under trademark Hytrel®.

As shown in detail in FIG. 3, the annular mounting 40 of the hollow seal body 28 preferably includes structure 50 for inhibiting contaminants from passing into the hollow interior 36 after seal 26 is affixed about the constant velocity joint 16 (FIG. 1). In the illustrated embodiment, structure 50 comprises at least one annular inner ring 52 disposed about an inner surface of the annular mounting 40 for promoting a sealing engagement between the annular mounting 40 and that portion of the member 12 (FIG. 1) axially extending beyond the boot 26. Ring 52 is preferably formed integral with the seal body 28. In a most preferred form of the invention, a second annular inner ring 54 is arranged in sealing combination and in axially spaced relationship to ring 52 for furthermore inhibiting contaminants from passing into the hollow interior 36 of boot 26. Ring 54 is preferably formed integral with the seal body 28.

As further illustrated in detail on FIG. 3, the annular mounting portion 40 of the seal body 28 preferably includes structure 55 for axially maintaining the retainer 41 (FIG. 1) in operable engagement with the annular mounting 40 when the boot 26 is affixed about the joint 16 (FIG. 1). In the illustrated embodiment, structure 55 comprises an annular ring 56 defined exteriorly about the annular mounting 40 of seal 26. The ring 56 further serves as a visual guide for facilitating proper placement of the retainer 41 relative to the boot 26. That is, the retainer 41 is preferably arranged about the annular mounting 40 in surrounding relation relative to the inner annular rings 52, 54 of structure 50. Accordingly, ring 56 is disposed in predetermined axial relationship relative to the seal rings 52, 54 to serve as a guide for placing retainer 41 relative to rings 52, 54. The annular ring 56 of structure 55 is preferably formed integral with the seal body 28.

As shown in detail in FIG. 4, the annular mounting portion 42 of the hollow seal body 28 preferably includes structure 60 for inhibiting contaminants from passing into the hollow interior 36 after seal 26 is affixed about the constant velocity joint 16 (FIG. 1). In the illustrated embodiment, structure 60 comprises at least one inner annular ring 62 disposed on an inner surface of the annular mounting 42 of boot 26 for promoting sealing engagement between the annular mounting 42 and that portion of the member 14 (FIG. 1) axially extending beyond the boot 26. Ring 62 is a preferably formed integral with the seal body 28. In a most preferred form of the invention, a second annular inner ring 64 is disposed in sealing combination with and in axially spaced relationship to ring 62 for furthermore inhibiting contaminants from passing into tile hollow interior 36 of boot 26. Ring 64 is likewise preferably formed integral with seal body 28.

As further illustrated in detail in FIG. 4, the annular mounting portion 42 of the seal body 28 preferably Includes stricture 65 for axially retaining the retainer 43 in operable engagement with the mounting 42 when the boot 26 is affixed about the joint 16 (FIG. 1). In the illustrated embodiment, structure 65 comprises a pair of axially spaced outer annular rings 66 and 68 disposed exteriorly about the annual mounting portion 42 of seal 26. The rings 66 and 68 of structure 65 furthermore serve as a visual guide for facilitating proper placement of the retainer 43 relative to the seal 26. That is, retainer 43 is preferably arranged about the annular mounting 42 in surrounding relation relative to the inner rings 62 and 64 of structure 60. Accordingly, the outer rings 66 and 68 are disposed in predetermined axial relationship relative to the inner rings 62 and 64 such that the rings 66 and 68 serve as guides for placing retainer 43 therebetween and, thus, in proper relationship relative to the sealing rings 62 and 64. The annular rings 66 and 68 of stricture 65 are preferably formed integral with the boot 26.

The present invention offers several unique and important characteristics to the overall seal deign. First, with the present invention, the material thickness across and about the entirety of each wall section 44, 46 is controlled and remains constant as schematically illustrated in FIG. 5. Second, with the present invention, the material thickness across and about each wall section 44 of a particular bellow-like configuration 34 is proportional to the material thickness across and about an adjoining wall section 46 of that respective bellow-like configuration. Moreover, with the present invention, and while maintaining continuity of the material thickness across and around the wall sections 44, 46 of a particular bellow-like configuration at one end of the seal, the material thickness of the wall sections 44, 46 of a bellow-like configuration disposed in axially spaced relation from other bellow-like configuration may have a different material thickness that is maintained constant across and about the entirety of the wall sections 44, 46 of the respective below-like configuration.

Another salient feature of the present invention concerns a seal 26 wherein the material thickness of the connecting sections 48 at the root and crest diameters of the bellow-like configurations are maintained constant about the entirety thereof and substantially equal to the material thicknesses of the wall sections 44, 46 as shown in that embodiment of the present invention illustrated in FIG. 5. It should be appreciated, however, that another salient feature of the present invention relates to a seal wherein the connecting sections 48 associate with those bellow-like configurations at one end of the seal 26 are constant about their entirety but controllably vary in material thickness relative to the those connecting sections 48 at an opposite end while remaining constant about their entirety.

Still a further unique feature of the present invention relates to a seal 26 wherein the connecting sections 48 at the root and/or diameters of the bellow-like configurations, while remaining constant about their entirety, are proportioned relative to the material thicknesses of the adjoining wall sections 44, 46. Turning now to FIG. 6, a detailed enlargement of an alternative form of bellow-like configurations 34 is shown. In this form of the invention, the material thicknesses of the angularly diverging wall sections 44 and 46 are substantially equivalent and are similar to that illustrated in FIG. 5. In this embodiment of the invention, however, the connecting sections 48' at the crest and root diameters of the bellow-like configurations are predesigned such that their material thicknesses while being generally consistent relative to each other about the entirety thereof are different than the material thicknesses of the wall sections 44 and 46. Alternatively, it is within the spirit and scope of the present invention that the bellow-like configurations 34 are predesigned such that the material thicknesses of the connecting sections 48' of the bellow-like configurations at one end of the boot 26 are different than the material thicknesses of the connecting sections 48 associated with the bellow-like configurations 34 at another location disposed axially along the length of the seal or boot 26. In either embodiment, it has been found preferable that the material thickness of any single connecting section remain constant about the entirety thereof to prevent undue stress and fatigue in particular areas of the boot or seal 26.

The ability to predesign the seal 26 in accordance with specific criteria is achieved by recognizing the advantages which can be obtained by creating the seal 26 from a pre-engineered and solid preform 126 illustrated in FIG. 7. As will be appreciated, the preform 126 is comprised of the same non-blow molding grade material comprising the body 28 of seal 26 and discussed above. Suffice it to say, the preform 126 comprises a one-piece elongated hollow body 128 having first and second open ends 130 and 132, respectively, with a plurality of axially spaced convolutions 134 therebetween. As will be appreciated, the number of convolutions 134 on the preform 126 are equal to the number of bellow-like configurations 34 on seal 26. The preform 126 defines a cavity 136 between the opposed open ends 130 and 132 thereof.

The open end 130 of preform 126 preferably includes an annular mounting 140 with a generally cylindrical-like configuration axially extending from an adjacent convolution 134 on the preform 126. The annular mounting 140 has a diameter and axial length substantially equivalent to the annular mounting 40 on seal 26. The open end 132 of preform 126 is similarly defined by an annular mounting 142 having a generally cylindrical-like configuration axially extending from an adjacent convolution on preform 126. The annular mounting 142 has a diameter and an axial length substantially equivalent to the annular mounting 42 on seal 26. Notably, however, the overall length of tile preform 126 is greater than the overall length of the seal 26.

As shown in FIG. 7, each convolution 134 on the preform 126 includes angularly diverging wall sections 144 and 146 that are joined to each other at the crest and root diameters of the preform 126 by connecting sections 148. It is also important to note that the crest and root diameters of the convolutions 134 on preform 126 are less than the crest and root diameters of the seal 26. The root diameters of the connecting sections 148 on the convolutions 134 are substantially equivalent to the root diameters of the connecting sections 48 of the bellow-like configurations 34 on the seal 26.

As shown in FIG. 8, the elongated and hollow shape of the preform 126 (FIG. 7) is injection molded using conventional injection molding equipment referred to in its entirely by reference numeral 160. Suffice it to say, the equipment 160 includes a die mold 161 defining a cavity 163 that conventionally accommodates a pre-engineered insert 167. Into the space or opening 169 defined between the cavity 163 of mold 161 and the outer predesigned configuration of the insert 167 non-blow molded material is introduced or injected using typical techniques. Notably, the configuration of cavity 163 defined by mold 161 and the outer predesigned configuration of insert 167 combine to define the material thicknesses of the angularly diverging wall sections 144, 146 and connecting sections 148 of the preform 126 (FIG. 7). As will be appreciated, the cavity 163 defined by mold 161 and the outer predesigned configuration of the insert 167 can be predesigned such that the material thicknesses of the wall sections 144, 146 and the connecting sections 148 of the perform 126 are maintained substantially constant relative to each other or may be changed relative to each other allowing the preform 126 to be pre-engineered or customized to any particular or unique seal application. It is important to note, however, that the mold 161 and insert 167 are preferably configured such that the preform 126 created thereby as a result of the molding process has substantially constant material thicknesses extending completely about both the wall sections 144 and 146 and the connecting sections 148. Alternatively, it is readily possible to engineer the die 161 or the insert 167 or both such that any suitable cross-sectional material thickness could be predesigned or pre-engineered into any particular wall section 144, 146 or connecting section 148 of the preform 126 to obtain desired performance characteristics for the seal 26 ultimately formed from the preform 126.

Turning to FIG. 9, the insert 167 is suitably configured toward one end with annular and axially spaced recesses 172 and 174. The recesses 172 and 174 on insert 167 are positioned and configured such that the injection molded material flows thereinto during the formation of the preform 126 (FIG. 7), thus, forming the inner annular rings 162 and 164, respectively, on preform 126 corresponding to rings 62 and 64, respectively, of structure 60 on seal 26 (FIG. 4). Similarly, the mold 161 is suitably configured with annular and axially spaced recesses 182 and 184. The recesses 182 and 184 are configured such that the injection molded material introduced into the mold 161 flows thereinto during formation of the preform 126, thus, forming outer annular rings 166 and 168, respectively, on the preform (FIG. 7) corresponding to rings 66 and 68, respectively, of structure 65 on seal 26 (FIG. 4).

Returning to FIG. 8, the insert 167 is suitably configured toward an opposite end with annularly shaped and axially spaced recesses 188 and 190. The recesses 188, 190 on insert 167 are positioned and configured such that the injection molded material flows thereinto during the formation of the preform 126, thus, forming inner annular rings 192 and 194 on the preform 126 (FIG. 7) corresponding to inner annular rings 52 and 54 of structure 50 on seal 26 (FIG. 3). Furthermore, and as shown in FIG. 8, mold 161 is suitably configured with an annular recess 195. Recess 195 on mold 161 is configured such that the injection molded material introduced into the mold 161 flows thereinto during formation of the preform 126, thus, forming an outer annular ring 196 on the preform 126 (FIG. 7) corresponding to annular ring 56 of structure 55 on seal 26 (FIG. 3).

Figure 10:
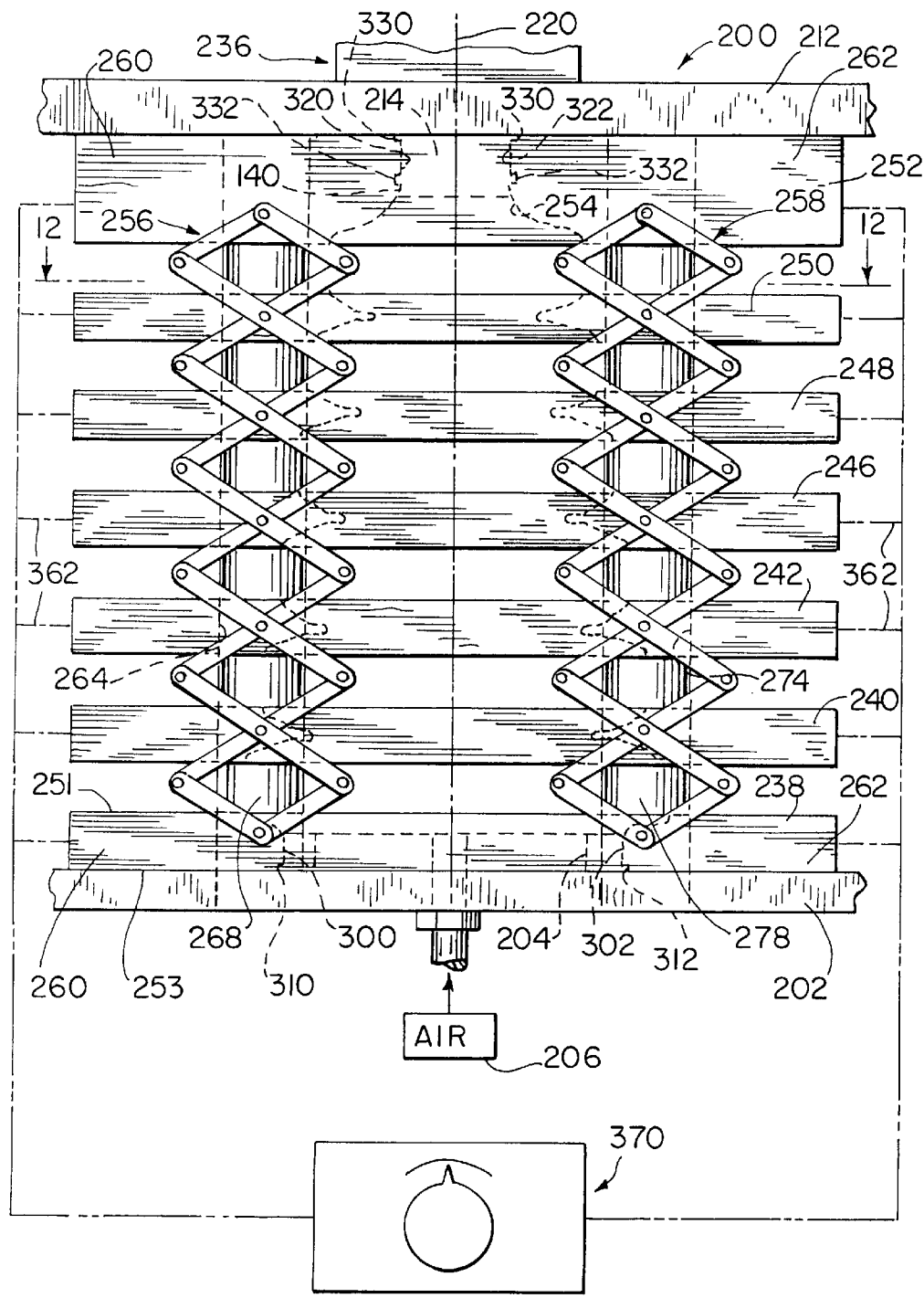
FIG. 10 is a schematic illustration of a collapsible die assembly used during formation of the present invention.
Figure 11:
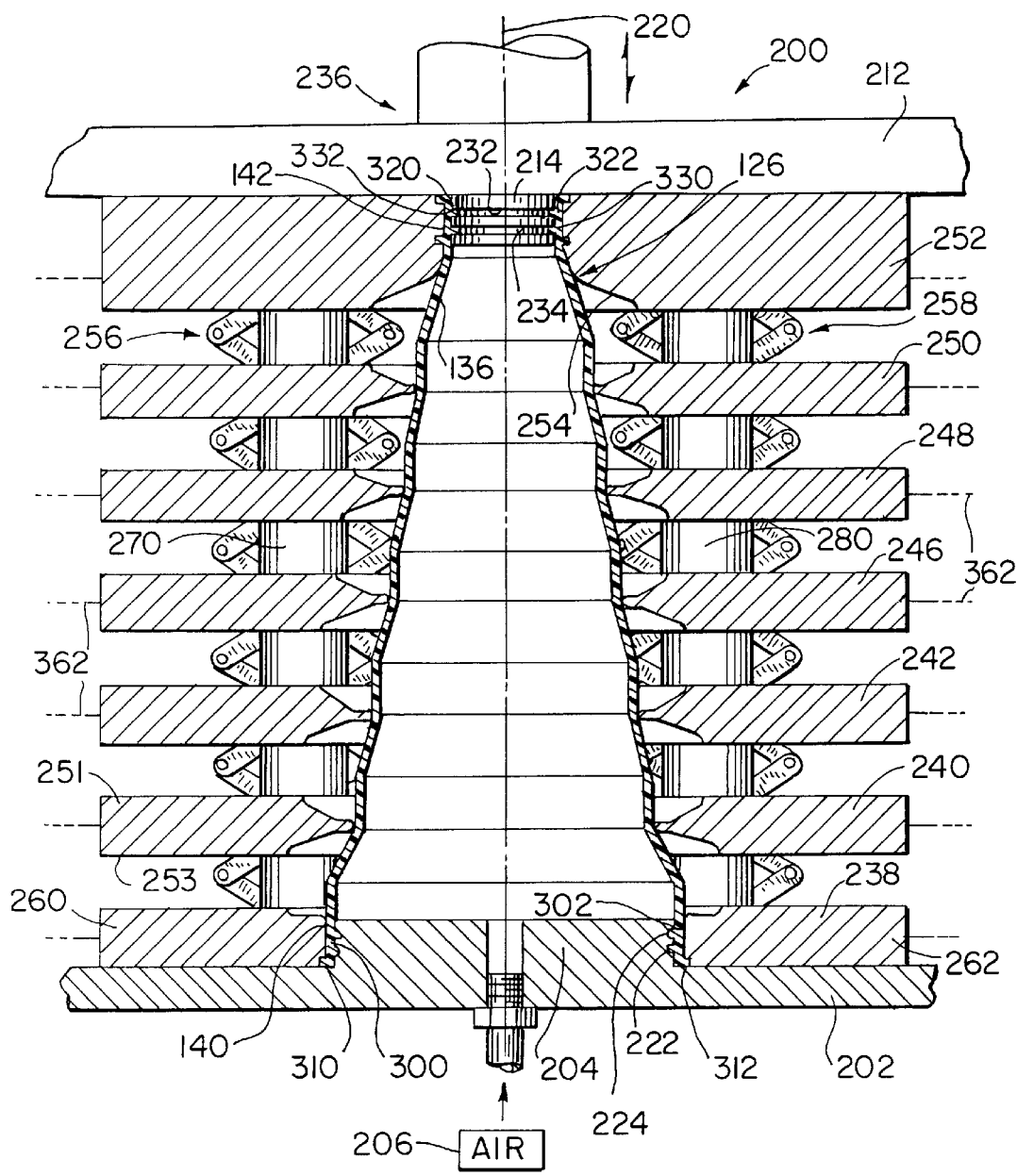
FIG. 11 is a fragmentary sectional view of the die assembly shown in FIG. 10.

After being formed, the injection molded and solid preform 126 is released from the mold assembly 160. The solid and rigid preform 126 (FIG. 7) is thereafter placed into a die assembly 200 for additional forming. As shown in FIG. 10, die assembly 200 includes a first plate or base 202 leaving an tipstick- generally cylindrically shaped member 204 mounted thereon. The cylindrical member 204 is specifically sized to snugly fit and axially extend within the annular mounting 140 of the preform 126. In a preferred form of the invention, and while extending axially into the enlarged annular mounting 140 of preform 126, preferably, and as shown in FIG. 11, the tipstruck annular member 204 does not axially extend beyond the axial length of the annular mounting 140 of preform 126. Furthermore, a source of fluid pressure 206 is connected to and communicates with the cylindrical member 204 to allow pressurized fluid, preferably air, to be introduced into the hollow cavity 136 of preform 126 (FIG. 7).

The die assembly 200 further includes a second member or cover 212 arranged in axially spaced relation relative to the base member or plate 202. The cover 212 includes a depending generally cylindrical member 214 that is specifically sized to snugly fit axially within the annular mounting 142 of the preform 126. In a preferred form of the invention, as shown in FIG. 11, and while extending axially into the annular mounting 142 of preform 126, the cylindrical extension 214 does not extend axially beyond the annular mounting member 142 of preform 126. Notably, the cylindrical extensions or members 204 and 214 are axially aligned relative to each other along a centerline or axis 220 of the die assembly 200.

In a most preferred form of the invention, and as shown in FIG. 11, the cylindrical member 204 on the base member or plate 202 includes axially spaced recesses 222 and 224. The recesses 222, 224 on the annular member 204 are sized to releasably accommodate the inner annular rings 192 and 194 (FIG. 7) formed on the annular mounting 140 of preform 126 when the preform 126 is placed into the die assembly 200 thereby enhancing the sealing relationship between the annular mounting 140 and the cylindrical member 204. Similarly, in a most preferred form of the invention, the cylindrical member 214 depending from the cover 212 includes axially spaced annular recesses 232 and 234 that are configured to accommodate the inner annular rings 162 and 164 oil the annular mounting 142 of the preform 126 thereby enhancing the sealing relationship between the preform 126 and the cylindrical depending member 214 on cover 212. Notably, the upper mounting plate 212 is operably connected to a press, generally identified by reference numeral 236 which is capable of imparting positive linear movement in opposite directions to the cover 212.

Figure 13:
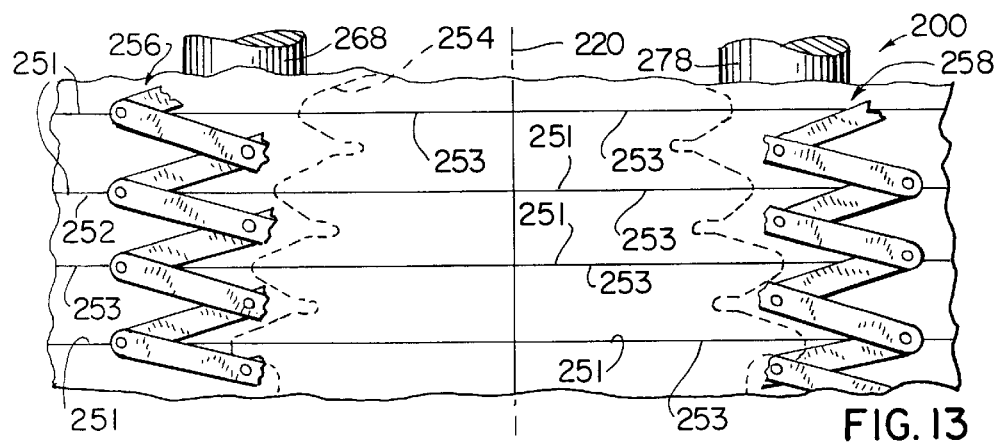
FIG. 13 is an enlarged fragmentary elevational view of a lengthwise portion of the die assembly.

As shown in FIG. 10, the die assembly 200 further includes a series of spaced plates 238, 240, 242, 244, 246, 248, 250 and 252 that are guided and disposed in spaced relation relative to each other between base 202 and cover 212. As shown in FIGS. 10, 11 and 13, each plate of the die assembly 200 defines parallel first and second surfaces 251 and 253, respectively. As will be discussed below, the plates 238 through 252 are configured and combine with each other to define a cavity 254 that receives and accommodates the preform 126 there within. As shown, the plates 238 through 250 are interconnected to each other through pairs of scissor-like linkage assemblies 256 and 258 disposed on opposite lateral sides of the centerline 220 of the die assembly 200.

Figure 12A:
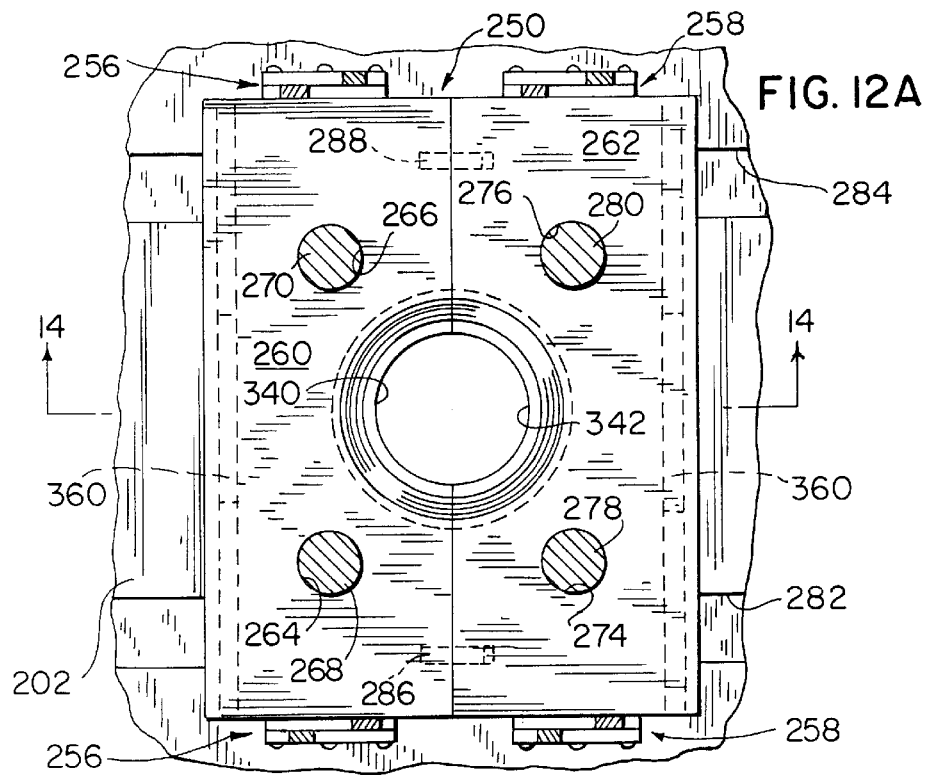
FIG. 12A is a plan view taken along line 12—12 of FIG. 10.
Figure 12B:
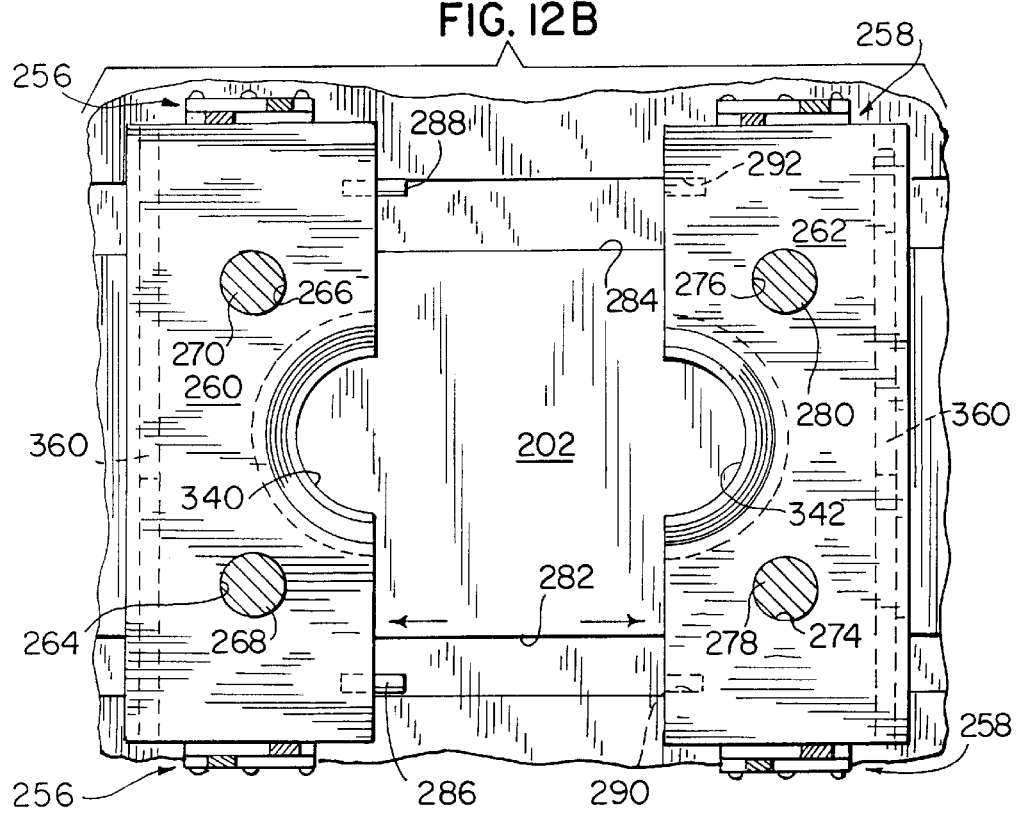
FIG. 12B is a plan view similar to FIG. 12 but showing plate sections of the die assembly in an open position relative to each other.

Turning to FIGS. 12A and 12B, plate 250 is illustrated for exemplary purposes. It will be appreciated that, with the exception of the opening defined thereby, all the plates 240 through 252 are similarly constricted. As shown, each plate is comprised of two plate sections 260 and 262 arranged in a common plane relative to each other by the pairs of linkage assemblies 256 and 258. In the illustrated embodiment of the invention, the plate sections 260 and 262 of each plate 238 through 252 are mirror images of each other. Plate section 260 of each respective plate of the die assembly 200 defines a pair of apertures 264 and 266 through which elongated guide bars 268 and 270 endwise pass, thus, guiding the plate section 260 of each respective plate 238 through 11 252 along a predetermined linear path of movement. Opposite ends of the guide bars 268 and 270 are suitably secured to plates 238 and 252. Plate section 262 defines a pair of apertures or holes 274 and 276 through which elongated guide bars 278 and 280 endwise pass thus guiding the plate section 262 of each respective plate 238 through 250 along a predetermined linear path of movement. Opposite ends of the guide bars 278 and 280 are likewise secured to the plates 238 and 252.

Preferably, the plate sections 260 and 262 of each of the plates 238 through 252 uniformly and equally move toward and away from each other relative to the centerline 220 of the die assembly 200. Because all the plate sections 260 of the respective plates 238 through 252 are joined to each other by their respective guide bars, all the plate sections comprising one half of the plates 238 through 252 of the die assembly 200 move conjointly relative to the centerline 220 while all the plate sections 262 of the respective plates 238 through 252 on the opposite side of the centerline 220 of the die assembly 200 conjointly move toward and away from the centerline 220.

In the embodiment of the invention illustrated in FIGS. 12A and 12B, suitable guideways 282 and 284 are provided on the base and cover 202 and 212, respectively. The guideways 282 and 284 combine with suitable and conventional guides (not shown) on the plates 238 and 252 of the die assembly 200 to control and facilitate linear movement of the plate sections 260 and 262 of the plates 238 through 252 in a controlled fashion toward and away from the centerline 220.

As shown in FIGS. 12A and 12B, suitable guide pins 286 and 288 are carried by one of the plate sections 260 and project axially toward the centerline 220 of the die assembly 200. In this regard, the corresponding plate section 262 of a respective plate defines a pair of pilot holes or apertures 290 and 292 for receiving the free ends of the pins 286 and 288 thereby effecting precise side-by-side alignment of the plate sections 260 and 262 of each plate 238 through 252 when the plate sections 260, 262 are moved into abutting relationship relative to each other.

Returning to FIGS. 10 and 11, the plate sections 260 and 262 comprising plate 238 define corresponding semi-circular recesses 300 and 302, respectively. The recesses 300 and 302 defined by the plate sections 260 and 262 of plate 238 are mirror images of the annular mounting 42 of seal 26 and are preferably configured to include a mirror image of a portion of the bellow-like configuration 34 of the bellowed seal 26 adjacent the annular mounting 40 of seal 26. In a most preferred form of the invention, the semi-circular recesses 300 and 302 defined by plate 238 further include semi-circular recesses 310 and 312, respectively. The recesses 310 and 312 are configured to releasably accommodate the outer annular ring 196 formed on the preform 126 (FIG. 7) in the region of the annular mounting 140.

As further shown on FIGS. 10 and 11, the plate sections 260 and 262 comprising plate 252 define corresponding semi-circular recesses 320 and 322, respectively. The recesses 320 and 322 defined by the plate sections 260 and 262, respectively, comprising plate 252 are configured as mirror images of the annular mounting 142 of preform 126 and are preferably configured to include a mirror image of a portion of the bellow-like configuration 34 adjacent to the reduced annular mounting 42 on the seal 26. In a most preferred form of the invention, the semi-circular recesses 320 and 322 of each plate section 260, 262, respectively, of plate 252 further defines a pair of axially spaced semi-circular recesses 330 and 332. The recesses 330 and 332 combine with each other to captively accommodate the outer axially spaced and annular rings 166 and 168 formed on tile annular mounting 142 of preform 126.

Returning to FIGS. 12A and 12B, the plate section 260 and 262 comprising each remaining plate 240 through 250 of the die assembly 200 each define semi-circular recesses 340 and 342, respectively. To accommodate those bellowed seal configurations having changing crest and root diameters along the length of the seal 26, the combined diameter of the opening defined by the semi-circular recesses 340, 342 of a particular plate 240 through 250 may change but the overall general configuration of the recesses 340 and 342 remain the same regardless of which plate 240 through 250 is chosen for discussion.

Figure 14:
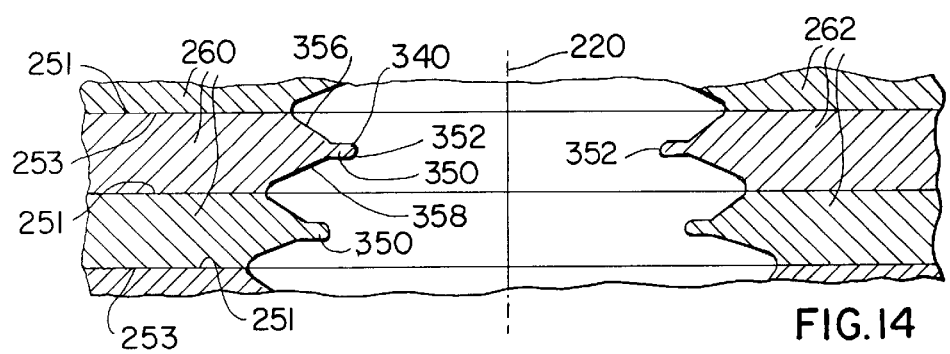
FIG. 14 is a sectional view taken along line 14—14 of FIG. 12.

Since the recesses 340 and 342 in the plate sections 260 and 262, respectively, are identical, only recess 240 will be described in detail and will suffice for an understanding of the structure. As shown in FIG. 14, an inner diameter of the recess 340 defined by each plate section 260, 262 is defined by a semi-circular and narrowed nose region 350 radially projecting inwardly toward and concentrically arranged relative to the centerline 220 of the die assembly 200. That is, the nose region 350 is narrower in width than a respective plate section and is generally centralized between the first and second generally parallel surfaces 251 and 253 of the respective plate section. Notably, the radial distance between an innermost radial surface 352 of the nose region 350 of any recess 340 and the centerline 220 of the die assembly (of any particular plate 240 through 250) defines one-half the root diameter of a respective bellow-like configuration 34 on the seal 26. As shown in FIG. 14, the nose region 350 radially extends outwardly from the innermost radial surface 352 for a relatively short distance and generally parallel to the surfaces 251 and 253 of the respective plate section. In radially spaced relation from the innermost radial surface 352 of the nose region 350, the recess of each plate section further defines a generally semi-conical configuration 356 extending radially away from the nose region 350 and extending to the first or top surface 251 of the respective plate section. Notably, the radial distance between that area on the respective plate section where the semi-conical configuration 356 intersects with surface 251 of the respective plate section defines approximately one-half the crest diameter of a respective bellow-like configuration on the 34 on the seal 26.

Disposed in opposed relation to configuration 356 on one side of the respective plate section, and in radially spaced relation from the innermost radial surface 352 of the nose region 350, each recess 340 in each plate section further includes a generally semi-conical configuration 358 extending radially away from the nose 350 in a direction opposite from configuration 356 to intersect with the other surface 253 of the respective plate section. Notably, the radial distance between the location whereat the semi-conical configuration 358 intersects with surface 253 of the respective plate section is generally equal to and defines about one-half the crest diameter of a bellow-like configuration 34 on the seal 26 spaced one axial pitch length from that bellow-like configuration created or formed, ill part, by the semi-conical surface configuration 356. It should be noted, however, that on those bellowed seal configurations having changing crest diameters, the conical surface 356 intersects with the surface 251 of a respective plate section at a location radially spaced from the location whereat the semi-conical surface configuration 358 intersects with the surface 253 of a respective plate section. Accordingly, the bellow-like configurations 34 on the seal 26 are permitted to chance in diameter.

After the preform 126 is inserted into the cavity 254 of the open die assembly 200, and after the projection or cylindrical member 214 depending from the cover 212 extends axially within the annular mounting 142 on the perform 126, and with the projection or upstruck cylindrical member 204 on base 202 extending axially within the annular mounting 140 of the preform 126, the die assembly is set to be closed. Thereafter, the plate sections 260, 262 of the plates 238 through 252 are conjointly brought toward the centerline 220 of the die assembly 200. As will be appreciated, as the plate sections 260, 262 of the plates 238 through 252 are slidably moved toward each other, the guile pins 286 and 288 on plate section 260 cooperate with the pilot holes or openings 290 and 292, respectively, oil plate sections 262 to effect proper alignment of the plate sections 260, 262 of each plate 238 through 252 relative to each other.

When the die assembly is closed, as by bringing the plate sections 260, 262 of the plate 238 through 252 into abutting relationship relative to each other, plate 238 clamps the annular mounting 142 of preform 126 between it and the cylindrical extension 204 of the base 202. Similarly, plate 252 clamps the annular mounting 140 of preform 126 between it and the depending axial extension 214 of plate 212. The plates 238 and 252 exert sufficient inward pressure along an about the annular mounting 140 and 142, respectively, as to establish and essentially airtight seal around the annular mountings 140 and 142 of the preform 126 and the die assembly 200. With the preform 126 so disposed in the position shown in FIG. 11, the nose region 350 on the plate sections 260, 262 of each plate 240 through 250 preferably contacts the molded preform 126 at the root diameter of each convolution 134.

As will be appreciated, the recesses 310 on plate sections 260 and 262 of plate 238 combine with the annular ring 196 on the preform 126 to enhance the fluid tight sealing relationship between the preform 126 and the closed die assembly 200. Moreover, the recesses 222 and 224 on the cylindrical member 204 (FIG. 11) combine with the inner annular rings 192 and 194 (FIG. 7), respectively, on the annular mounting 140 of the preform 126 to enhance the fluid-tight sealing relationship between the preform 126 and the closed die assembly 200.

Similarly, when the die assembly 200 is closed, the recesses 330 and 332 (FIG. 10) defined by plate sections 260 and 262 of plate 252 combine with the outer annular rings 166 and 168 (FIG. 7), respectively, on the annular mounting 142 of the preform 126 to enhance the sealing relationship between the perform 126 and the closed die assembly 200. Moreover, the recessed 232 and 234 on the depending cylindrical member 214 of cover 212 combine with the inner annular rings 162 and 164 (FIG. 7), respectively, on the reduced annular mounting 142 to enhance the sealing relationship between the preform 126 and the closed die assembly 200.

To transform the preform 126 into the seal 26, the collapsible die assembly 200 is heated to whatever temperature is required to allow the normally rigid non-blow molded material forming the preform 126 to become flexible. Testing has revealed that temperatures ranging between about 125° C. and about 182° C. have been most successful. In this regard, and although alternative means of heating the die assembly are intended to come within the spirit and scope of the present invention, in tile illustrated embodiment each plate section 260 and 262 of each plate 238 through 252 is provided vital a conventional cartridge heater 360 (FIGS. 12A and 12B) and thermocouple wiring 362 (FIG. 10) to heat the die assembly 200. The thermocouple wiring 362 for each cartridge heater 360 extends from the respective plate sections 260 and 262 of each plate 238 through 252 to a conventional temperature controller 370 (FIG. 10). In the illustrated form of the invention, the temperature controller 370 is configured to allow the temperature of each plate 238 through 252 to be individually or separately controlled.

Figure 15:
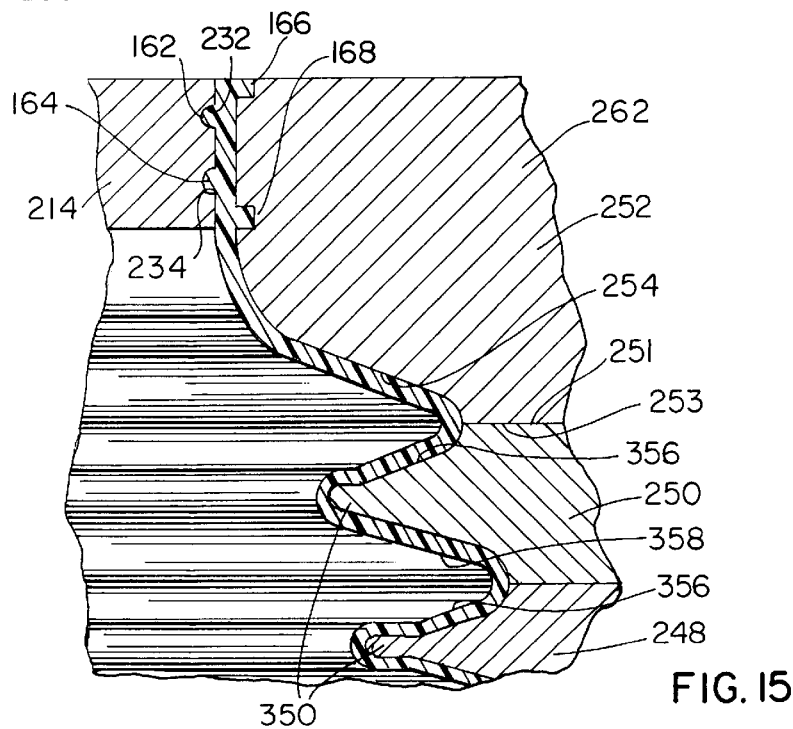
FIG. 15 is a fragmentary enlarged sectional view of a portion of the die assembly shown in a forming position.

When the rigid preform 126 is adequately heated, the plates 238 through 252 are axially squeezed together through operation of the press 236. Fluid pressure is also introduced through the cylindrical extension 204 into the hollow interior 136 of the preform 126 to help force the convolutions 134 of the preform 126 radially outwardly against the walls of the cavity 136 defined by the closed die assembly 200 as shown in FIG. 15. As will be appreciated, the convolutions 134 on the preform 126 are predesigned to resemble or somewhat proximate the bellow-like configurations 34 on the seal 26. Accordingly, and since the material used to form the preform 126 is from non-blow molded material, the expansion of the preform 126 to the ultimate shape of the bellowed seal 26 is not as drastic as normally required with other blow molding techniques.

The plates 238 through 252 of the die assembly 200 are squeezed together for a predetermined linear distance by the press 236. In the illustrated form of the invention, the plates 238 through 252 are squeezed together until confronting surfaces 251 and 253 of adjacent plates abut or contact with each other. As will be appreciated, the pairs of scissor like linkages 256 and 258 connected to the plates 238 through 252 control the positions of the plates 238 through 252 relative to each other. In the embodiment illustrated, the cavity 136 defined by the die assembly 200 has been designed such that the openings defined by the recesses 330 and 332 of joined or closed plate sections 260, 262, respectively, of each plate 238 through 252 are deeper and more aggressive than those of the desired finished product.

This die configuration allows for any elastic stresses remaining in the part which would affect the final shape.

After the die assembly 200 has been collapsed a desired distance, it has been found beneficial thereafter to operate the press 236 in a manner forcibly expanding the die assembly 200 with the preform 126 remaining clamped there within. The subsequent expansion of the preform 126 is to accommodate for residual stresses in the preform 126. Thereafter, the die assembly 200 is opened by slidably moving the plates 238 through 252 apart from each other and away from the centerline 220 to allow the formed bellow seal 26 to be removed from the die assembly 200.

In view of the above, it will be appreciated that in addition to describing a bellowed seal adapted be fitted about a pivotal mechanism having members extending axially from opposite ends thereof, the present invention further discloses a method for producing a bellowed seal of the type adapted to be fitted about a constant velocity joint 16 or other comparable mechanism. A salient feature of that method involves forming the bellowed seal from a hollow rigid predesigned or pre-engineered preform 126 formed from a non-blow molding grade material that is heated and configured within a collapsible die assembly 200. The steps involved with such process includes providing in an elongated hollow rigid preform 126 formed from a non-blow molding grade material and having first and second opposite ends 130, 132 with a series of convolutions 134 therebetween. Each convolution 134 on the rigid preform 126 has a root diameter and a crest diameter with wall sections 144, 146 extending therebetween. The method further includes the step of inserting the rigid preform 126 axially into an elongated die assembly 200 such that the die assembly 200 circumferentially surrounds the preform 126 between opposed ends 130, 132 thereof to confine radial expansion of the preform 126.

The method further includes the step of heating the die assembly 200 and axialy compressing the rigid preform 126 to cause the wall sections of the preform to deform into the configuration defined by the die assembly 200. The methodology of the present invention is further enhanced by introducing pressurized fluid into the hollow interior 136 of the preform 126 to cause deformation of the predesigned convolutions 134 into the shape of the cavity defined by the closed die assembly 200. The step of heating the die assembly further includes the step of controlling the heated temperature of the die assembly within the range of about 120° C. to about 190° C. In a most preferred form of the invention, the die assembly is heated within the range of about 135° C. temnperature to about 375° F. temperature.

Forming the bellowed seal 26 from a non-blow molding grade material offers several advantages over heretofore known bellowed seals. First, forming the bellowed seal 26 from a non-blow molding grade material is more economical than those seals which utilize blow molded materials. Moreover, non-blow molding grade materials have enhanced flexibility, strength, impact resistance and creep resistance and offer good flex crack and abrasion resistance. Moreover, the present invention allows the solid preform 126 to be inventoried if desired prior to insertion within the die assembly 200. Unlike heretofore known molten and generally cylindrical parison, the preform 126 is heated to control temperatures only during the forming process rather than relying, upon maintaining;i the parison at an elevated temperature.

Furthermore, significant advantages are realized from forming the seal 26 from a preform. For example, with heretofore known devices, the blow molded material is expanded under the influence of pressure and the material thicknesses in the wall sections and connecting sections of the bellows cannot be controlled. In contrast, with the present invention, it is possible to pre-engineer the seal configtirationl such that the material thicknesses of the wall sections of each bellow-like configtirationl is maintained equal about the entirety of the respective bellow. Moreover, with the present invention, it is possible to pre-engineer the seal such that, and while maintaining a constant wall thickness thereabout, the material thickness of the adjoining wall sections of a respective bellow can be controllably modulated with respect to each other. Alternatively, the wall sections of the bellows at a particular axial location along the length of the seal 26 can be predesigned such that they vary relative to wall sections of bellow-like configurations disposed in axially spaced relation along the length of the seal to permit the seal to be customized to a particular application.

By predesigning the seal, it is possible to furthemore control the material thicknesses at the root and crest diameters of the seal. That is, with the present invention, it possible to pre-engineer the seal such that the material thicknesses of the connecting sections 48 can be proportioned relative to the respective wall sections 44, 46 extending therefrom. The connecting sections can be predesigned such that they have material thicknesses that are substantially equivalent about their entirety to that of the wall sections extending therefrom. Alternatively, the connecting sections can be predesigned such that they have material thicknesses that are substantially constant about their entirety and in proportion to the wall sections 44, 46 extending therefrom moreover, and while retaining constant about their entirety, the connecting sections can vary in material thickness depending upon their axial disposition along the length of the seal 26. The ability to predesign and pre-engineer the seal design allows predetermined spring rates and other advantageous design features and characteristics to be incorporated into the bellow-like configurations 34 to reduce the likelihood of seal fatigue and failure.

The configuration of the seal 26 also offers several benefits. First, the annular inner rings 52 and 54 at the enlarged annular mounting 40 inhibit contaminants from passing between the shaft 12 (FIG. 1) and the seal 26 toward the hollow interior 36. Second, the inner rings 62 and 64 at the reduced annular mounting 42 furthermore inhibits contaminants from passing into the hollow interior 36 when the seal 26 is mounted about the shaft 14 thereby protecting the joint 16. Furthermore, structure 55 comprising the outer annular ring 56 initially guides placement of the retainer apparatus 41 (FIG. 1) about the enlarged annular mounting 40 and thereafter inhibits the retainer apparatus 41 from becoming inadvertently separated from the annular mounting 40. Similarly, structure 65 comprising outer annular rings 66 and 68 initially guide placement of the retainer apparatus 43 about the annular mounting 42 and thereafter inhibit the retainer apparatus 43 from inadvertently separating from the annular mounting 42.

From the foregoing, it will be observed that numerous modifications and variations can be effected without departing from the tree spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A method for producing a bellowed seal adapted to be fitted about a constant velocity joint of a vehicle, said method comprising the steps of:

provividing an elongated hollow preform having first and second opposed ends with a series of convolutions therebetween, each convolution having root diameter and a crest diameter with wall sections extending therebetween;

placing said rigid preform axially into an elongated die assembly such that said die assembly circumferentially surrounds said preform between opposed ends thereof to confine radial expansion of said preform, wherein said die assembly comprises a series of interconnected axially spaced plates, each plate having upper and lower surfaces;

heating said die assembly;

controlling temperature ranges of the various plates of said die assembly of said die assembly during said heating step such that different plates of said die assembly are heated to different temperatures to facilitate deformation of said preform;

axially compressing the preform to cause the wall sections of said preform to deform into a configuration generally defined by said die assembly; and causing said heating and compressing steps to be effected substantially simultaneously.

2. The method of forming a bellowed seal according to claim 1 wherein the rigid preform has varying cross-sectional configurations designed thereinto and along the length thereof.

3. The method of forming a bellowed seal according to claim 1 further including the step of introducing pressurized fluid into the hollow interior of said preform to cause deformation of said preform into the shape of said die assembly.

4. The method of forming a bellowed seal according to claim 1 wherein the step of heating said die assembly further includes the step of controlling the heated temperature of said die assembly within the range of about 110° C. to about 190° C.

5. The method of forming a bellowed seal according to claim 1 wherein the step of axially compressing the preform further includes the step of compressing the die assembly until confronting surfaces of the plates are arranged in predetermined axially spaced relationship relative to each other.

6. The method of forming a bellowed seal according to claim 1 including the further step of elongating the preform after axially compressing the rigid preform to cause the wall sections of the preform to deform into the configulrationi generally defined by said die assembly.

* * * * *

UNITED STATES PATENT AND TRADEMARK OFFICE
CERTIFICATE OF CORRECTION

PATENT NO. : 6,010,657
DATED : 1/4/2000
INVENTOR(S) : Wydra et al.

It is certified that error appears in the above-identified patent and that said Letters Patent is hereby corrected as shown below:

Column 19, line 5, after "hollow" insert --rigid--

Column 19, line 7, after "having" insert --a--

Column 19, line 20, delete --of said die assembly--

Column 20, line 11-12, delete --heating said die assembly further includes the step of--

Column 20, line 12, after "the" delete --heated--

Column 20, line 12, after "temperature" insert --ranges of the various plates--

Column 20, line 13, after "assembly" insert --involves limiting the temperature ranges--

Signed and Sealed this

Seventh Day of November, 2000

Attest:

Q. TODD DICKINSON

*Attesting Officer*          *Director of Patents and Trademarks*

UNITED STATES PATENT AND TRADEMARK OFFICE
CERTIFICATE OF CORRECTION

PATENT NO. : 6,010,657

DATED : January 4, 2000

INVENTOR(S) : Neal E. Wydra; David W. Geick, Jr.

It is certified that error appears in the above-identified patent and that said Letters Patent is hereby corrected as shown below:

```
Column 1, line 9, "se" should be --seal--;
Column 1, line 35, "c,mm1n" should be --common--;
Column 1, line 38, "effect ends" should be --effect these ends--;
Column 1, line 66, "art" should be --are--;
Column 2, line 40, "du ring" should be --during--;
Column 2, line 57, "foni" should be --form--;
Column 4, line 6, "perform" should be --preform--;
Column 4, lines 10 and 26, "tile" should be --the--;
Column 4, line 22, "connecting-section" should be --connecting
                    section--;
Column 4, line 42, "mountings" should be --mountings at--;
Column 4, line 63, "used," should be --used--;
Column 5, line 7, "Tile" should be --The--;
Column 12,line 25, "tipstick" should be --upstruck--;
Column 12,line 31, "tipstruck" should be --upstruck--;
Column 13,line 14, "there within" should be --therewithin--;
Column 13,line 21, "constricted" should be --constructed--;
Column 13,line 30, "through 11 252" should be --through 252--;
Column 15,line 31, "chance" should be --change--;
Column 15,line 46, "oil" should be --on--;
Column 16,line 28, "tile" should be --the--;
Column 16,line 30, "vital" should be --with--;
Column 17,line 64, "maintaining;i" should be --maintaining--;
Column 18, lines 6 and 7, "configtirational" should be
                          --configuration--;
```

UNITED STATES PATENT AND TRADEMARK OFFICE
CERTIFICATE OF CORRECTION

PATENT NO.   : 6,010,657
DATED        : January 4, 2000
INVENTOR(S)  : Neal E. Wydra; David W. Geick, Jr.

It is certified that error appears in the above-identified patent and that said Letters Patent is hereby corrected as shown below:

Column 18, line 33, "therefrom moreover" should be --therefrom. Moreover--;
Column 18, line 33, "retaining" should be --remaining--;
Column 18, line 61, "tree" should be --true--;

Signed and Sealed this

Thirtieth Day of January, 2001

Attest:

Q. TODD DICKINSON

*Attesting Officer*           *Director of Patents and Trademarks*